US010255646B2

(12) United States Patent
Howald et al.

(10) Patent No.: US 10,255,646 B2
(45) Date of Patent: Apr. 9, 2019

(54) SYSTEM AND METHOD FOR IMPLEMENTATION AND OPERATION OF STRATEGIC LINKAGES

(71) Applicant: Thomson Reuters Global Resources (TRGR), Baar (CH)

(72) Inventors: Blake Howald, Northfield, MN (US); Isabelle Moulinier, Richfield, MN (US); Andrew Mushett, Apple Valley, MN (US); John Ohle, Washington, DC (US); Chris Schultz, Mendota Heights, MN (US)

( * ) Notice: Subject to any disclaimer, the term of this patent is extended or adjusted under 35 U.S.C. 154(b) by 756 days.

(21) Appl. No.: 14/460,202

(22) Filed: Aug. 14, 2014

(65) Prior Publication Data

US 2016/0048509 A1   Feb. 18, 2016

(51) Int. Cl.
*G06Q 50/18*   (2012.01)

(52) U.S. Cl.
CPC .................................. *G06Q 50/18* (2013.01)

(58) Field of Classification Search
CPC ........... G06F 17/3053; G06F 17/30864; G06F 17/30867; G06F 17/30011; G06F 17/30345
USPC ........................................................ 707/749
See application file for complete search history.

(56) References Cited

U.S. PATENT DOCUMENTS

| | | | | |
|---|---|---|---|---|
| 7,028,259 | B1 * | 4/2006 | Jacobson | G06F 17/278 |
| | | | | 715/236 |
| 7,174,301 | B2 * | 2/2007 | Florance | G06F 17/30241 |
| | | | | 340/995.14 |
| 2002/0049727 | A1 * | 4/2002 | Rothkopf | G06F 17/30867 |
| 2003/0046277 | A1 * | 3/2003 | Jackson | G06F 17/3061 |
| 2004/0162830 | A1 * | 8/2004 | Shirwadkar | G06F 17/3087 |
| 2004/0210443 | A1 * | 10/2004 | Kuhn | G10L 15/22 |
| | | | | 704/276 |
| 2005/0108200 | A1 * | 5/2005 | Meik | G06F 17/3071 |
| 2005/0165743 | A1 * | 7/2005 | Bharat | G06F 17/30867 |
| 2005/0171955 | A1 * | 8/2005 | Hull | G06Q 50/01 |
| 2006/0112111 | A1 * | 5/2006 | Tseng | G06F 17/30616 |
| 2006/0173985 | A1 * | 8/2006 | Moore | G06F 17/3089 |
| | | | | 709/223 |
| 2006/0235885 | A1 * | 10/2006 | Steele | H04L 67/26 |
| 2006/0236258 | A1 * | 10/2006 | Othmer | G06Q 30/0243 |
| | | | | 715/774 |

(Continued)

OTHER PUBLICATIONS

Patent Application No. 2015213296. Patent Examination Report No. 1. Australian Government—IP Australia. 5 pages. Dated Apr. 30, 2016.

*Primary Examiner* — Hosain T Alam
*Assistant Examiner* — Nicholas E Allen
(74) *Attorney, Agent, or Firm* — Faegre Baker Daniels LLP

(57) ABSTRACT

The present invention relates to a system, method and medium for associating portions of advocational documents with portions of tribunal decisions in view of common or similar characteristics that are identified between the associated entities. In addition, the associated advocational document portions are imparted with certain characteristics resulting from such an association, such as inheriting the topic of the associated tribunal decision portion or inheriting general characteristics of the decision such as judge or jurisdiction. This allows for the subsequent retrieval of advocational documents in view of various criteria associated with a decision or portion thereof.

22 Claims, 11 Drawing Sheets

(56) References Cited

U.S. PATENT DOCUMENTS

| | | | |
|---|---|---|---|
| 2006/0248440 A1* | 11/2006 | Rhoads | G06F 17/30728 715/236 |
| 2007/0038610 A1* | 2/2007 | Omoigui | G06F 17/3089 |
| 2007/0061839 A1* | 3/2007 | South, Jr. | G06Q 30/02 725/35 |
| 2007/0094247 A1* | 4/2007 | Chowdhury | G06F 17/30864 |
| 2007/0097929 A1* | 5/2007 | Dunko | G06F 17/3087 370/338 |
| 2007/0100650 A1* | 5/2007 | Ramer | G06F 17/30749 705/26.1 |
| 2007/0100863 A1* | 5/2007 | Shardanand | G06F 17/3089 |
| 2007/0106627 A1* | 5/2007 | Srivastava | G06Q 10/10 706/20 |
| 2007/0118802 A1* | 5/2007 | Gerace | G06F 17/30867 715/738 |
| 2007/0124493 A1* | 5/2007 | Fogg | H04L 29/06027 709/231 |
| 2007/0125860 A1* | 6/2007 | Lapstun | G06F 3/0317 235/462.01 |
| 2007/0132767 A1* | 6/2007 | Wright | G06K 9/00771 345/475 |
| 2007/0143279 A1* | 6/2007 | Yao | G06F 17/30864 |
| 2007/0149212 A1* | 6/2007 | Gupta | H04L 67/18 455/456.1 |
| 2007/0150516 A1* | 6/2007 | Morgan | G06F 17/30241 |
| 2007/0161382 A1* | 7/2007 | Melinger | H04L 67/18 455/456.1 |
| 2007/0174304 A1* | 7/2007 | Shrufi | G06Q 10/10 |
| 2007/0185847 A1* | 8/2007 | Budzik | G06F 17/30389 |
| 2007/0192613 A1* | 8/2007 | Amoroso | H04L 29/06027 713/179 |
| 2007/0198943 A1* | 8/2007 | Grason | G06Q 30/06 715/776 |
| 2009/0076836 A1* | 3/2009 | Arvidson | G06Q 50/18 705/311 |
| 2009/0083328 A1* | 3/2009 | Vivona | G06Q 50/18 |
| 2010/0114911 A1 | 5/2010 | Al-Kofahi et al. | |
| 2010/0332520 A1* | 12/2010 | Lu | G06F 17/30722 707/769 |
| 2011/0004606 A1* | 1/2011 | Aumann | G06F 17/30675 707/759 |
| 2011/0184935 A1* | 7/2011 | Marlin | G06Q 50/10 707/719 |
| 2012/0054240 A1* | 3/2012 | Zhang | G06F 17/30542 707/780 |
| 2012/0166425 A1* | 6/2012 | Sharma | G06F 17/30696 707/722 |

* cited by examiner

E.g., DECISION– Vermont v. Mayo, 183 Vt. 113

Case Headnoted Paragraph

[17] ¶ 27. Defendant's juror-bias and corruption claims were, in any event, waived due to the fact that defendant failed to raise them until his motion for a new trial. By statute and through case law, Vermont generally bars challenges to the composition of the jury after that jury has been empaneled. In *In re Nash* we held *126 that the "right to challenge a juror is waived by a failure to object before the jury is [e]mpaneled if the basis for the objection is known or might, with reasonable diligence, have been discovered during voir dire." 158 Vt. 458, 467, 614 A.2d 367, 372 (1991). Vermont Rule of Criminal Procedure 24(b) similarly requires that challenges for cause be made prior to the empanelment of the jury.

Contains:

- Case Citation: *In re Nash*, 158 Vt. 458, 467 (1991)
- Case Quotation: ... "right to challenge a juror is waived..."
- Statute Citation: Vermont Rule of Criminal Procedure 24(b)
- Text: e.g., "failed to raise", "jury has been empaneled", "failure to object", "voir dire" ....

Fig. 2

E.g., BRIEF – Vermont v. Mayo, 183 Vt. 113

Brief Argument Paragraphs

[17] *28 III. THE COURT ACTED WITHIN ITS DISCRETION IN DENYING THE MOTION FOR A NEW TRIAL, IT CORRECTLY DETERMINED THAT APPELLANT FAILED TO MEET THE TWO-PART TEST FOR JUROR MISCONDUCT CLAIMS

...

It is true that a defendant has a right to a trial free of extraneous influences. *State v. Squiers*, 2006 VT 26, ¶20, 896 A.2d 80, 87 (quotation omitted); *Gorbea*, 169 Vt. 57, 59 (1999). It is well established that a defendant alleging extraneous influences or *29 juror misconduct must show that an irregularity occurred, and that the irregularity had the capacity to affect the jury's verdict. Squiers, 2006 VT 26, ¶21 ((citing *State v. McKeen*, 165 Vt. 469, 472 (1996)); *Gorbea*, 169 Vt. at 60. In order to obtain a new trial on the grounds of a juror's nondisclosure or misstatements, the defendant "must first demonstrate that a juror failed to answer honestly a material question on voir dire, and then further show that a correct response would have provided a valid basis for a challenge for cause." *In re Nash*, 158 Vt. 458, 466 (1991) (quoting *McDonough Power Equip., Inc. v. Greenwood*,⁹ 464 U.S. 548, 556 (1984)).

...

Contains:

- Overlap Case Citation: *In re Nash*, 158 Vt. 458, 466 (1991)
- Overlap Text: "voir dire", ....

Fig. 3

Biscotti v. Yuba City Unified School Dist.
Court of Appeal, Third District, California    December 27, 2007    156 Cal.App.4th 554    69 Cal.Rptr.3d 825

Document | Filings (6) | Negative Treatment (1) | History (3) | Citing References (43)

Page # ▼     AA     Ski

2 Cases that cite this headnote

4 Municipal Corporations

A plaintiff seeking to hold a public entity liable for injuries caused by a dangerous condition on public property has the burden to establish that the condition is one which creates a hazard to persons who foreseeably would use the property with due care. West's Ann.Cal.Gov.Code §§ 830, 830.2, 835.

906 — 1 Case that cites this headnote

5 Schools

902 — Chain link fence on school property, separating school grounds from adjacent residences, was not a "dangerous condition" that could subject school district to liability for injuries sustained by child when he propped his bicycle against the fence, stood on top of the bicycle in an attempt to grab oranges from neighbor's tree, and then slipped and fell, cutting his arm badly on the metal prongs on top of the fence; child's use of his bicycle as a substitute ladder to reach over the fence was not a reasonably foreseeable use of the fence, and the risk of falling and being seriously injured should have been obvious to child. West's Ann.Cal.Gov.Code §§ 830, 830.2, 835.

See 5 Witkin, Summary of Cal. Law (10th ed. 2005) Torts, §§ 259, 260; Flahavan et al., Cal. Practice Guide: Personal Injury (The Rutter Group 2007) ¶ 2:902 et seq. (CAPI Ch. 2-E); Cal. Jur. 3d Government Tort Liability, § 33 et seq.; Cal. Civil Practice (Thomson/West 2003) Torts, § 31:18 et seq.

1 Case that cites this headnote
904 — 3 Briefs (from this case) addressing this point of law Click here to access briefs discussing the "dangerous condition" argument

SYSTEM AND METHOD FOR IMPLEMENTATION AND OPERATION OF STRATEGIC LINKAGES

CROSS-REFERENCE TO RELATED APPLICATION

The present application is filed on the same day as a related application entitled "SYSTEM AND METHOD FOR INTEGRATION AND OPERATION OF ANALYTICS WITH STRATEGIC LINKAGES" U.S. patent application Ser. No. 14/460,222.

BACKGROUND

Legal research has long involved searching for court and administrative decisions that relate to a particular topic in which the researcher is interested. This research is often conducted where the researcher is confronted with a particular legal situation and wishes to know what the pertinent law is and how various courts have handled the same or similar situations.

SUMMARY

The present invention relates to enhancing the current state of legal research (and research relating to the adjudicative process, generally) by providing a system, method and medium for associating portions of advocational documents with portions of tribunal decisions in view of common or similar characteristics that are identified between the associated entities. In addition, the associated advocational document portions are imparted with certain characteristics resulting from such an association, such as inheriting the topic of the associated tribunal decision portion or inheriting general characteristics of the decision such as judge or jurisdiction. This allows for the subsequent retrieval of advocational documents in view of various criteria associated with a decision or portion thereof.

More specifically, and using a brief as an example of an advocational document, embodiments of the present invention contemplate determining which portion of a decision concerning a related brief provides the "best" match (based on pre-set criteria) for a selected portion of the brief. Assuming this best match is above a predetermined threshold, the two portions are then associated with each other. This allows a subsequent reviewer of a portion of the decision to request one or more portions of one or more briefs that have been associated with that decision portion. This may be of great value to a researcher reviewing, e.g., a court decision, since related portions of briefs may provide valuable insight into proceedings for a given case. For example, through the present invention, it may readily be gleaned that a judge took concepts or even verbiage directly from one particular party's brief, and thus relied on the brief for deciding at least a particular aspect of the case. Embodiments of the present invention also contemplate that a topic (e.g., "schools") affiliated with the decision portion is inherited by the associated brief portion.

In addition to associating portions of advocational documents with portions of decisions as previously indicated, embodiments of the present invention contemplate that portions of the advocational document may be associated with certain attributes (e.g., judge, jurisdiction and attorney). This allows a reviewer to then search for advocational documents that may be unrelated (e.g., not part of the same tribunal record) to the decision at issue based on the attributes.

DESCRIPTION OF THE DRAWINGS

FIG. 2 is an example portion of a decision embodying concepts of the present invention;

FIG. 3 is an example portion of an advocational document embodying concepts of the present invention;

FIG. 9 is an example depicting embodiments for allowing a requestor to view a portion of a decision and access associated briefs and portions thereof;

FIG. 10 is another example depicting embodiments for allowing a requestor to access associated briefs and portions thereof; and FIG. 11 is an example depicting embodiments for allowing a requestor to access briefs not associated with a portion of a decision via requested attributes.

Figure 1:
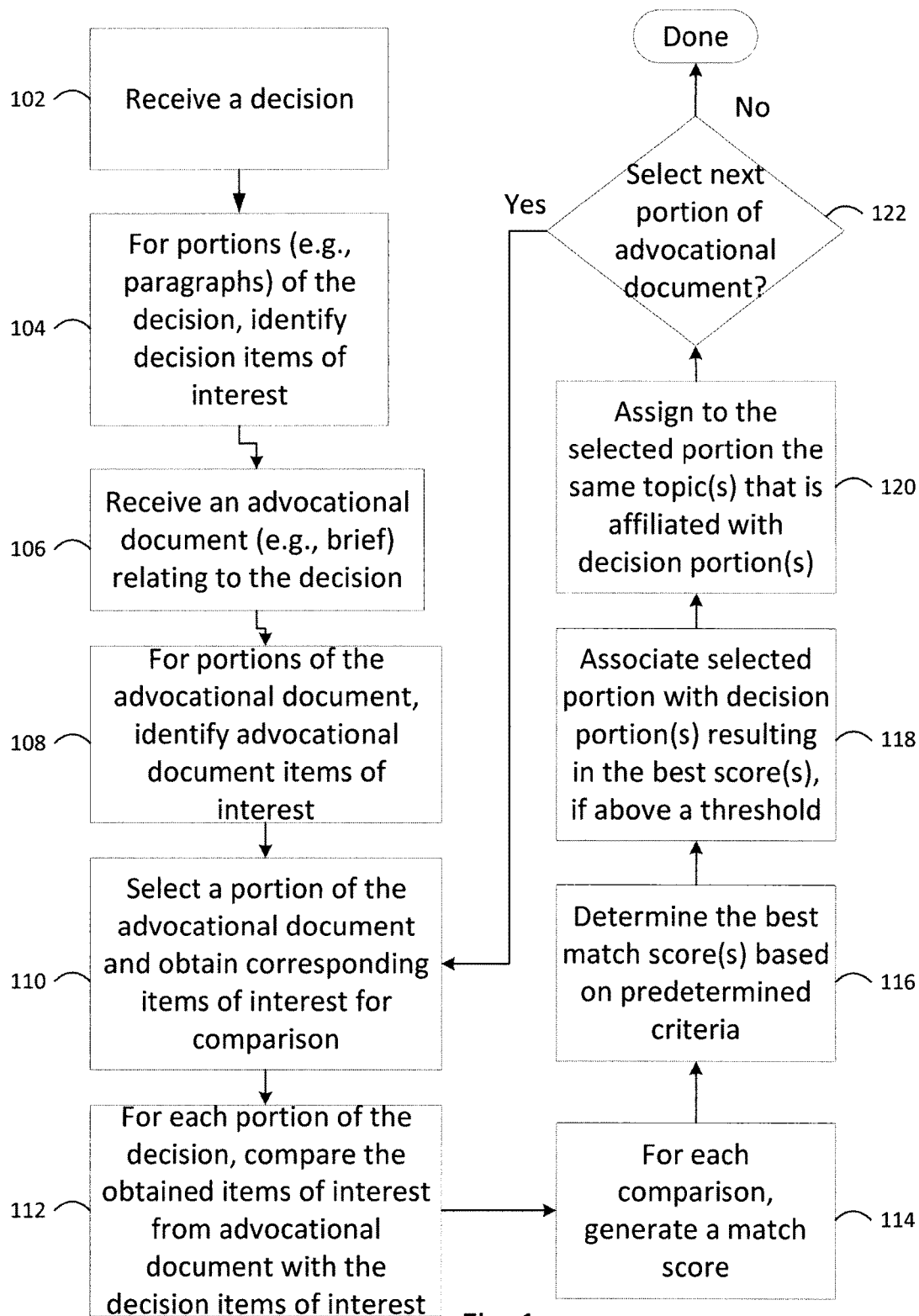
FIG. 1 is a flow diagram depicting an illustrative method of associating advocational documents with decisions in accordance with embodiments of the present invention.

While the present invention is amenable to various modifications and alternative forms, specific embodiments have been shown by way of example in the drawings and are described in detail below. The present invention, however, is not limited to the particular embodiments described. On the contrary, the present invention is intended to cover all modifications, equivalents, and alternatives falling within the ambit of the present invention as defined by the appended claims.

Although the term "block" and "module" may be used herein to connote different elements illustratively employed, the terms should not be interpreted as implying any requirement of, or particular order among or between, various steps or functions disclosed herein unless and except when explicitly referring to the order of individual steps or functions.

DETAILED DESCRIPTION

The term "advocational document" as used herein encompasses documents used in conjunction with any number of different types of proceedings, including judicial and administrative proceedings. One example of an advocational document is a brief, such as those of a petitioner, respondent, amicus curiae, or trial court movant.

Embodiments of the present invention are now described in greater detail with regard to FIG. 1. Referring to FIG. 1, a decision is received, as indicated by block 102. This decision could be a court decision, administrative decision, or any other type of decision where a tribunal or the like has resolved some type of dispute.

For portions of the decision, decision items of interest are identified, as indicated by block 104. These decision items of interest help identify the content of a particular portion of a decision to determine whether to associate the portion with a particular portion of an advocational document (as explained below). Embodiments of the present invention envision that the size of a "portion" for these associative purposes is typically one paragraph in length, but it may also be as small as a single word or as large as a plurality of paragraphs.

In embodiments of the present invention, one or more portions of the decision are associated (or have been pre-associated) with a topic. In more specific embodiments, topical associations could be reflected in the form of key numbers (also used for creating headnotes, or the like, for a decision) such as those used in the West Key Number System® by Thomson Reuters. Multiple topics could also be assigned to a given portion of a decision.

Still referring to FIG. 1, an advocational document (e.g., brief) relating to the decision is received, as indicated by block 106. For portions of the advocational document, items of interest are identified, as indicated by block 108. Embodiments of the present invention envision that a portion of an advocational document is a paragraph, and that items of interest are separately identified for each unique paragraph in the advocational document. However, it should be understood that embodiments of the present invention contemplate that a portion of the advocational document for which items of interest are identified may range from a plurality of paragraphs in length to a single word.

Additional details regarding embodiments of the types of decision items of interest that may be used are discussed below with particular regard to FIGS. 2 and 3. The nature of the associations between portions of a decision and advocational document will also be discussed below.

It should be understood that, in embodiments of the present invention, the receiving of an advocational document and identification of associated items of interest may occur prior to receiving the decision (i.e., blocks 106 and 108 may occur prior to blocks 102 and 104). In general, embodiments of the present invention contemplate that the receiving is done by a computer.

A portion of the advocational document is selected and its corresponding items of interest are obtained in preparation for the upcoming comparison to ascertain the best match with a portion of the decision. This is indicated by block 110. For the comparison, the items of interest associated with the selected portion of the advocational document are compared with the items of interest from (in embodiments of the present invention) each portion of the decision, as indicated by block 112. In the course of comparing the selected portion of the advocational document with a portion of the decision, a match score is generated, as indicated by block 114. Embodiments of the present invention contemplate that this match score may be generated in any number of ways. For example, it could be generated based purely on the number of items of interest in the selected portion of the advocational document that match identically (or at least similarly within a given tolerance level) with items of interest in a portion of the decision. Where the matching of similar items is envisioned, a thesaurus may be used (i.e., synonyms may be considered as a match). Also, certain types of items of interest may be weighted more heavily than other types of items of interest.

Once all (or as many as desired) of the portions of the decision have been compared with the selected portion of the advocational document and all match scores have been generated, the best match score(s) is determined based on a predetermined criteria, as indicated by block 116. An example of the predetermined criteria may simply be to select the highest match score and associate the portion of the decision from which that highest score was generated with the selected portion of the advocational document. Another example is to determine which of a range of match scores are the best match scores (e.g., the highest 5 scores) and associate the selected portion of the advocational document with the 5 portions of the decision whose comparison resulted in the best match scores. Yet another example is to associate the selected portion of the advocational document with all portions of the decision whose comparison resulted in a match score above a predetermined level. It may also be decided that, for a portion of a decision associated with a highest match score, there are other portions associated with that portion in a hierarchy (based, e.g., on topic) and that all of the decision portions within that hierarchy should be considered "best" (and thus ultimately associated with the selected portion of advocational document as discussed below). In general, it should be understood that embodiments of the present contemplate that any number of other criteria could also be used to determine what constitutes the best score or scores.

Once the best match score(s) is determined, the one or more portions of the decision associated with that match score(s) is identified. Those identified one or more portions represent the closest match in the decision (in view of the items of interest and predetermined criteria used) to the selected portion of the advocational document. In embodiments of the present invention, the identified portion(s) of the decision will be associated with the selected portion of the advocational document, but only if aspects of the match were above a certain threshold. This is generally indicated by block 118. Such associations are also referred to as investigative linkages. Use of the threshold is to ensure that the "best" match is still sufficiently close to warrant associating the selected portion of the advocational document with the identified portion(s) of the decision that generated that match. One example use of the threshold would be to only implement the association described above if the best match score were above a certain numerical value.

In embodiments of the present invention, the headnote (as described below) tied to the portion of the decision from which the best match score was generated is linked with the selected portion of the advocational document (or possibly linked with a headnote section, or the like, of the advocational document). In this way, the selected portion of the advocational document is associated with that portion of the decision via a headnote in the headnote section of the decision (and/or a headnote section of the advocational document, as further explained below).

In embodiments of the present invention, the selected portion of the advocational document is also assigned the same or similar topic(s) as the portions(s) of the decision associated with the best match score(s), as indicated by block 120. Thus, if a portion of the decision at issue is affiliated with the topic of "schools," the selected portion of the advocational document would generally also be affiliated with that topic. Embodiments of the present invention also envision situations where the selected portion of the advocational document is assigned a topic that is similar or related to the topic of the associated portion of the decision where, e.g., a topic that is related by hierarchy to the topic of the portion of the decision is assigned. In addition, embodiments of the present invention also envision situations where a headnote is created in the advocational document commensurate with the topic of the associated decision portion and a user navigates to the appropriate portion of the advocational document via links in the headnotes.

After block 120, a next portion of the advocational document is selected (unless "done"), as indicated by block 122. Of course, this process is also envisioned to be implemented for all advocational documents for which associations with a decision may be desired.

As mentioned above, the present invention contemplates numerous types and usages of items of interest that may be employed to determine associations between a selected portion of an advocational document and one or more portions of a decision. Specific examples of items of interest that may be identified and then compared between document portions include text n-grams, case citations, statute citations and quotations. It should be understood that the present invention also envisions embodiments where a portion of a decision is selected and then compared with the various (e.g., all) portions of an advocational document.

An example of a portion of a decision for which decision items of interest were identified is depicted in FIG. 2. In this example, the portion is shown to be a headnoted paragraph from the state court decision of Vermont v. Mayo. (A headnoted paragraph is a paragraph tied to (i.e., associated with) a headnote, where a headnote is associated with a particular topic that summarizes the paragraph and is placed at the top of a decision.) Embodiments of the present invention contemplate that some or all of the portions of the decision that are evaluated for possible association with selected portions of advocational documents are headnoted paragraphs. However, it should be understood that the present invention also contemplates embodiments where non-headnoted portions of the decision are affiliated with certain topics and are directly associated with portions of advocational documents. It should also be understood that the present invention envisions that structures similar to headnotes could also be used to implement the same or similar functionality.

Still referring to FIG. 2, within the paragraph, a case citation exists to In re Nash and a statute citation is present for Vermont Rule of Criminal Procedure 24(*b*). Such citations are flagged as items of interest that are associated with the paragraph. Any number of database schemes may be used to store these associations and be used to facilitate other relationships between information as described herein.

Also within the paragraph is a case quotation from In re Nash. Case quotations are also example items of interest, so this quotation is shown as flagged. In addition, n-grams (i.e., a segment of a sentence comprising n words) may also be identified and stored for later comparison. Thus, if n=2, then all groups of two consecutive words (i.e., bi-grams) would be stored for later comparison. (A larger "n" will enhance how meaningful a match is likely to be, but at the cost of potentially missing at least some valuable matches). Also as shown in FIG. 2, this paragraph is affiliated with a topic represented by the number 17. In embodiments of the present invention, this number is a key number representative of the topic assigned to the paragraph.

FIG. 3 is an example of a selected portion of an advocational document which, in this example, is a paragraph from a brief from one of the parties of the Vermont v. Mayo decision. Embodiments of the present invention envision that the items of interest would be identified for this document in the same manner as was described above with regard to the decision portion. Referring to FIG. 3, what is highlighted in boxes are the items of interest that were common to the portion of the decision disclosed in FIG. 2. Thus, the two items of interest that overlap are the case citation to In re Nash and the text bi-gram "voir dire." Also, this example presumes that the portion of the decision of FIG. 2 was deemed the "best" match for the portion of the brief in FIG. 3, and as a result, the key number (i.e., 17) associated with the portion of the decision is affiliated with this portion of the brief. In this way, the topic associated with that decision portion is inherited by the selected portion of the brief. Also, in determining that the decision of FIG. 2 was the best match, the case citation could have been weighted higher than a single matching n-gram, or vice versa.

In embodiments of the present invention, portions of any number of advocational documents may be associated in the manner described above with portions of a decision. For example, in the context of an appellate decision, advocational documents whose portions may be associated with a decision include appellant, appellee and briefs of amici curiae. Also, portions of advocational documents may be associated with decisions that are less directly related where, e.g., portions of a brief in a lower court proceeding are associated with portions of a related appellate court decision. Portions of a decision may also be associated with portions of advocational documents from the same case but where, e.g., the advocational document relates to a different but related motion from the decision. In embodiments of the present invention, such aforementioned advocational documents may be considered as being part of the same tribunal record as the decisions they are indicated as associated with.

Figure 4:
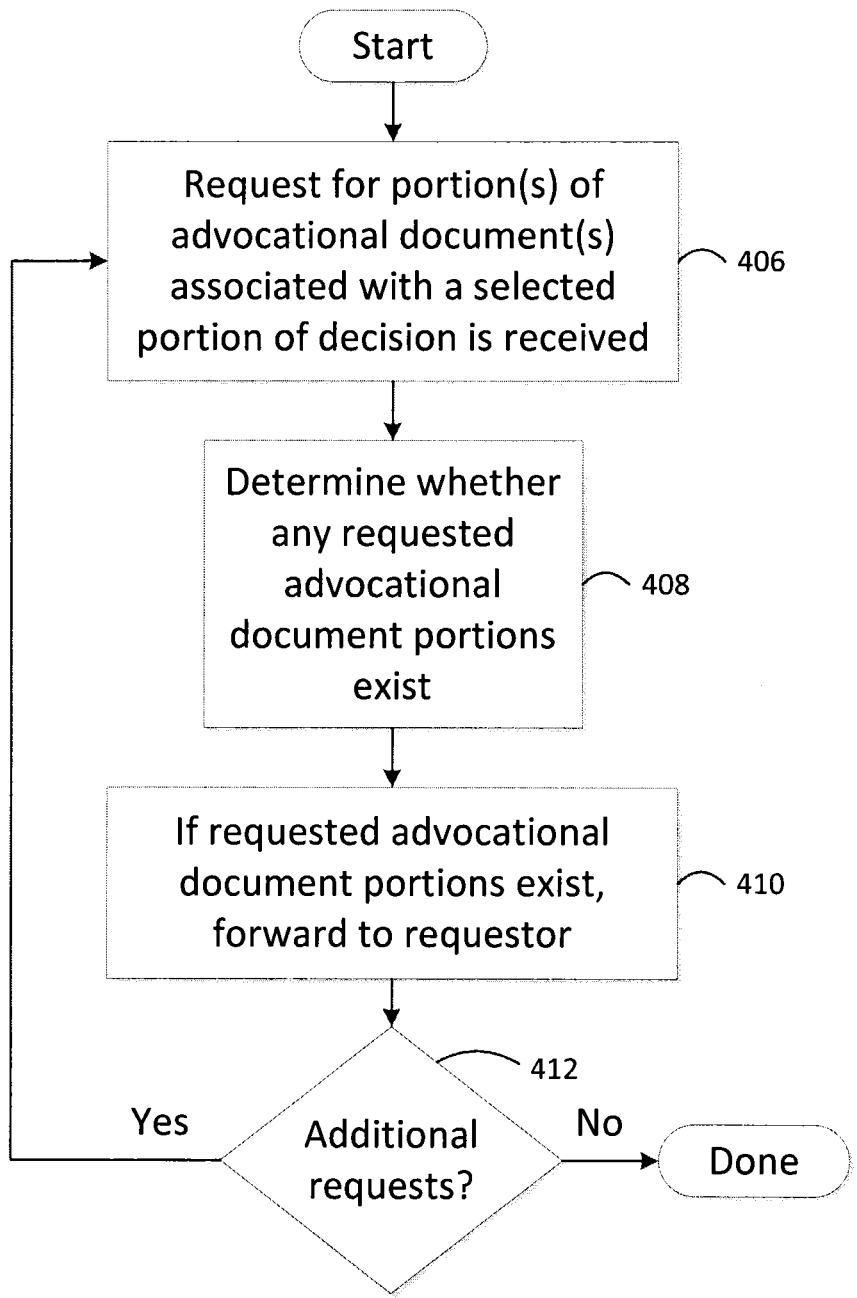
FIG. 4 is a flow diagram depicting an illustrative method of retrieving advocational documents associated with a decision in accordance with embodiments of the present invention.

FIG. 4 discloses a process which allows a user to view a particular decision, and then request one or more portions of advocational documents that had been associated therewith as discussed previously. For example, a user viewing a portion of a decision may want to see a portion of an appellant's brief associated with that particular decision portion being viewed. As mentioned, for any given portion of a decision, there may or may not have been a portion of an advocational document that sufficiently coincided with the decision portion at issue to warrant an association. Where such an association does exist between two document portions, though, it is envisioned that they had been affiliated with the same or similar topic. Also as mentioned, embodiments of the present invention contemplate that only headnoted paragraphs of a decision are portions that are associated with portions of advocational documents (either directly or via the appropriate headnote portion of a decision), though other embodiments are not so limiting.

Still referring to FIG. 4, once the associations have been set up, a request (by, e.g., a user) for portions of one or more advocational documents associated with a selected portion of a decision may be received. This is indicated by block 406. A determination is then made as to whether any requested advocational document portions, in fact, exist (i.e., whether any associations exist between the selected decision portion and a portion of an advocational document), as indicated by block 408. If one or more does exist, they are then forwarded to the requestor, as indicated by block 410. If there are additional requests, then the sequence begins again, as indicated by block 412.

Embodiments of the present invention envision that a requestor may, for example, indicate via any number of I/O mechanisms and interfaces, a desire to receive portions of one or more advocational documents that are associated with a selected portion of a decision.

An example interface utilizing various aspects and embodiments of the present invention as described above is depicted by FIGS. 9 and 10. This particular example depicts embodiments for allowing a requestor to view a portion of a decision and access associated briefs and portions thereof. More particularly, the requestor accesses the briefs via the headnote section of the decision. Thus, a requestor viewing a substantive portion of a decision and desiring associated briefs relating to that portion would go to the topically related portion of the headnote section and (via links) request associated portions of briefs.

Referring first to FIG. 9, headnotes from the headnote section of the California Court of Appeals decision of Biscotti v. Yuba City Unified School District are shown. The headnote 5 ("Schools") and associated headnote paragraph of interest are shown at 902. This indicates there are one or more paragraphs in the body of the decision, itself, relating to (and summarized by) the headnote and associated headnote paragraph. That portion of the body of the decision (not shown) is also envisioned to be designated with the number 5. In this way, the headnote and associated headnote paragraph are tied in with portions of the body (not shown) of the decision, and the number 5 is used as a locational reference. "Schools" as a topic is also associated with a reference number (not shown) indicative of the topic. In embodiments of the present invention, this reference number may be a key number such as that used in the West Key Number System®.

Regarding specifics of this example, a user viewing a portion of the decision associated with the topic of "schools" may want to view briefs associated with that topic, and would go to the headnote area (via, e.g., scrolling or link) shown by FIG. 9. From headnote 902, the requestor may choose to view one or more briefs relating to this decision (and relating to the topic of "schools") by selecting a link, as indicated by 904. A user desiring to see whether a particular brief is associated with a headnote (and, via the headnote, whether a particular brief is associated with any relevant portion of the decision tied to the headnote) may select the link at 904 and determine whether the brief (and thus any relevant portion thereof) has been associated with the portion of the decision selected by the user. In addition, a single link that brings a user to a brief selection page/interface may be utilized (as envisioned by FIGS. 9 and 10) or multiple links to briefs may be implemented at the headnote and/or decision body area such that there is no need to have a brief selection page/interface. In the latter instance, where such a link is to, e.g., a respondent's brief, it is envisioned that the link may bring a user directly to the relevant portion of a respondent's brief relating to the topic of the portion of the decision being viewed.

As seen by the current example, the links are placed in the vicinity of the headnotes and headnote paragraphs. However, as indicated previously, it should be understood that links to advocational documents such as briefs could also be placed in the body of the decision where, e.g., the portion from the decision relating to "schools" resides.

As indicated above, there may be portions of a decision for which no portion of an advocational document (e.g., brief) is associated. This is the case with the headnote "4 Municipal Corporations," where there is no link to a brief, and the only link is to the portion of the decision associated with the headnote, as indicated by 906.

Figure 10:
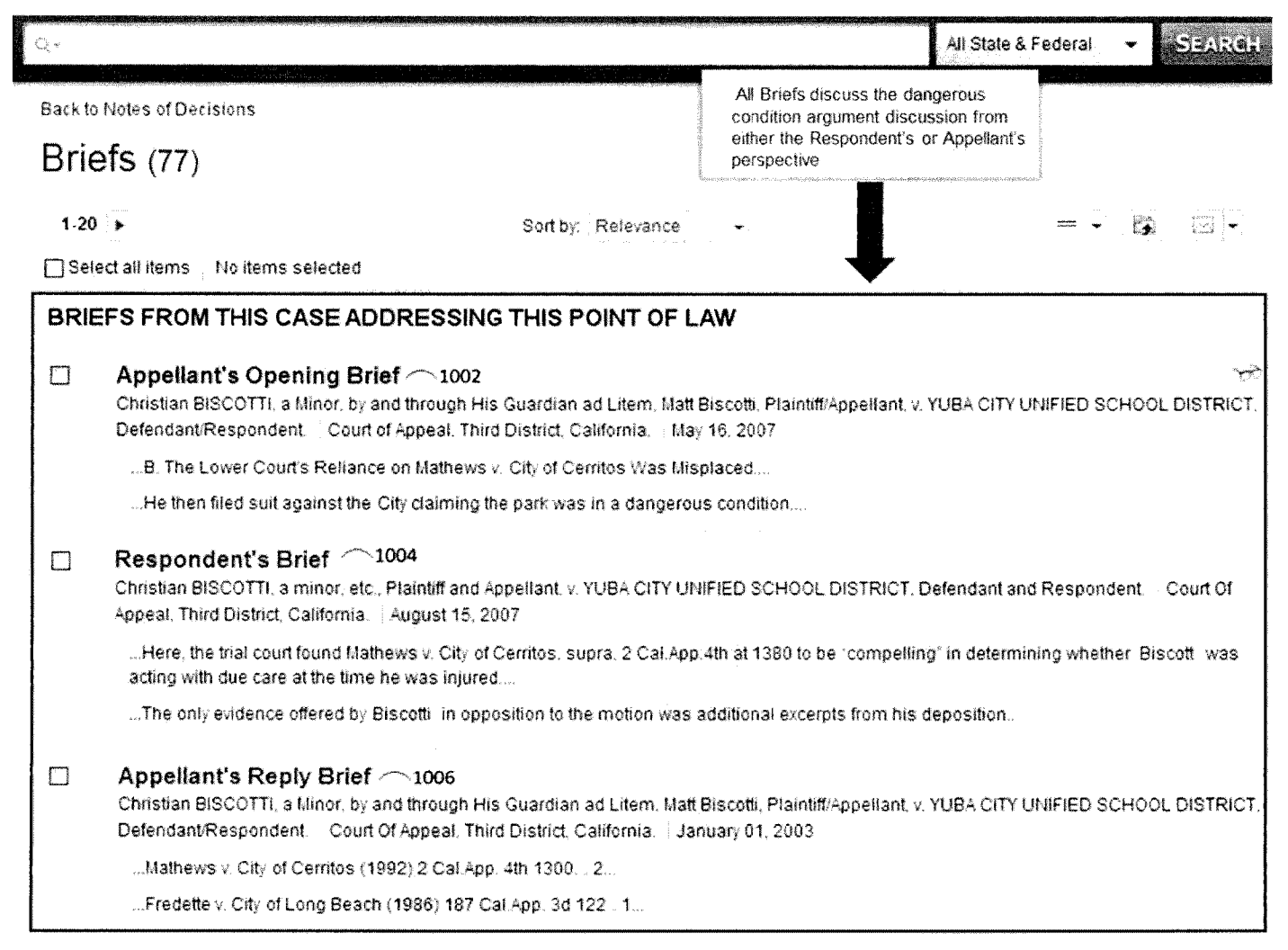

In one example as shown herein, when users select link 904, they are taken to a brief selection page, as shown in the example of FIG. 10. Referring to FIG. 10, an appellant's opening brief 1002, respondent's brief 1004 and appellant's reply brief 1006 are available for selection by a user. In embodiments of the present invention, when a user selects a particular brief to be viewed, it takes the user to a relevant headnote area within the brief (e.g., relating to schools) (not shown) that had been set up during the decision association process described above. From there, a user may navigate to a pertinent portion of the brief, itself, relating to schools. In other or overlapping embodiments, the selection of a particular brief may take a user directly to the pertinent portion of the brief relating to the topic of schools.

Figure 5:
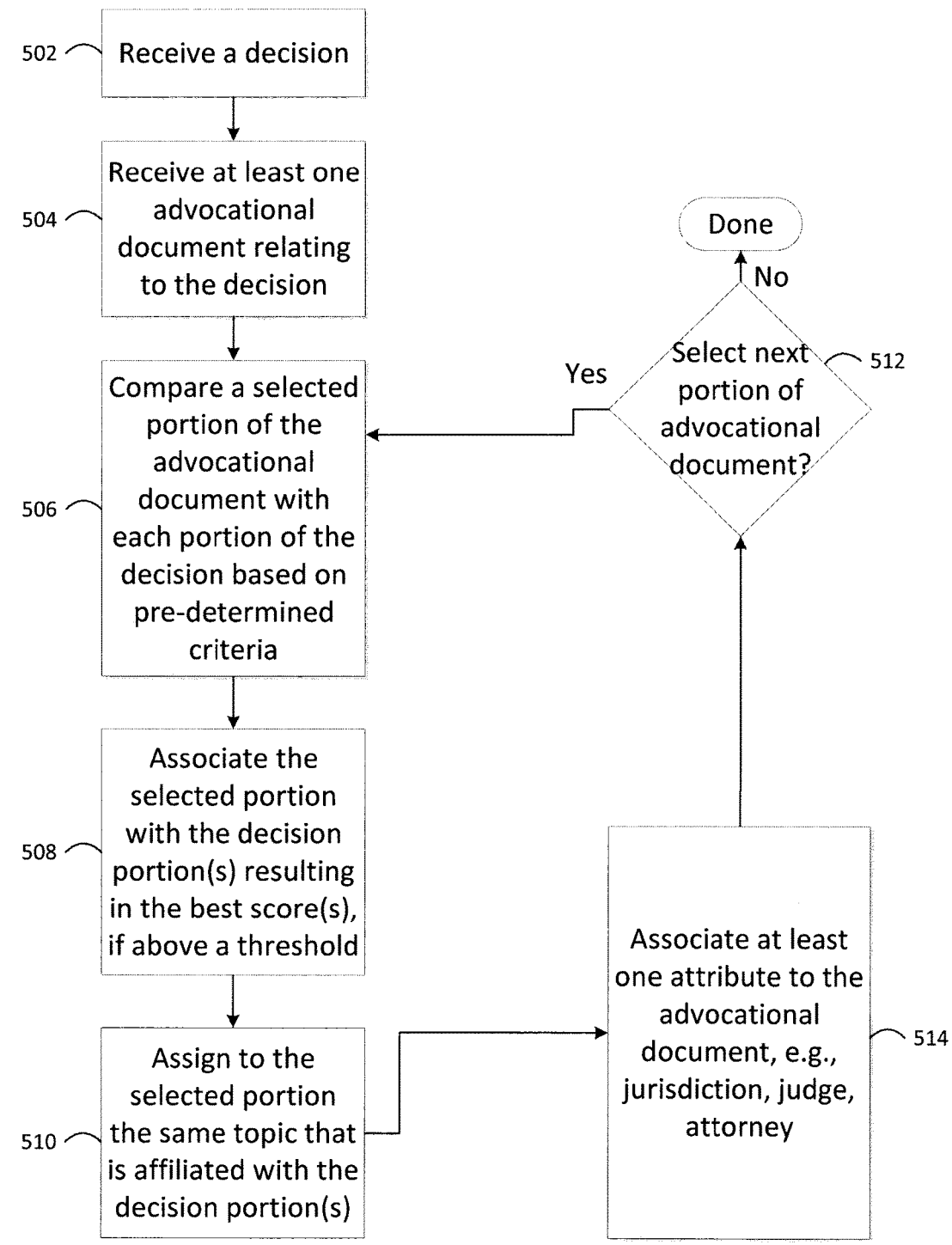
FIG. 5 is a flow diagram depicting an illustrative method of associating advocational documents with decisions and specified attributes in accordance with embodiments of the present invention.

FIG. 5 discloses embodiments for associating attributes to advocational documents such that subsequent requests for portions of these advocational documents may subsequently be performed in view of those attributes (and in view of the topic of a portion of a decision being considered). Examples of such attributes include jurisdiction, judge, law firm and attorney. Embodiments of the present invention contemplate that this association of attributes be accomplished in conjunction with the association of portions of advocational documents with portions of a decision as discussed above. In this way, for example, a user may be reviewing a portion of a decision relating to a given topic and request relevant portions of advocational documents not only from advocational documents directly relating to that decision, but also advocational documents on that same topic from unrelated decisions that are from, e.g., a selected jurisdiction, judge, attorney, etc.

Referring now to FIG. 5, a decision is received, as indicated by block 502. At least one advocational document relating to the decision is also received, as indicated by block 504. A selected portion of the advocational document is compared with each portion (or at least certain portions) of the decision based on pre-determined criteria, as indicated by block 506. In embodiments of the present invention, the pre-determined criteria may be the items of interest as described above, although it should be understood that any number of other criteria are contemplated. Also as contemplated by embodiments of the present invention, the comparison of a portion of an advocational document and a portion of the decision yields a score indicative of the level of similarity between the two documents in view of the pre-determined criteria.

The selected portion of the advocational document is associated with the portion(s) of the decision whose comparison resulted in the best score, as long as the score was above a certain threshold, as indicated by block 508. The selected portion is then assigned the same topic affiliated with that decision portion(s), as indicated by block 510.

In general, embodiments of the present invention contemplate that the implementation of blocks 502-510 may be the same or similar to implementations described in conjunction with embodiments mentioned above. However, it should be understood that other embodiments are also envisioned for associating portions of advocational documents with portions of a decision.

At least one attribute is also associated with an advocational document for the purpose of, e.g., allowing a user who is reviewing a decision not related to the advocational document to access a portion of the advocational document that may nonetheless be of interest. Examples of attributes include jurisdiction, judge and attorney, as indicated by block 514. As discussed further below, this allows a user viewing a passage in a decision (or headnote) relating to, e.g., the topic of "schools" to view not only portions of advocational documents that were part of the record of that decision, but advocational documents concerning that same topic from other decisions that, e.g., were handed down by a selected judge. In general, embodiments of the present invention envision that the attributes associated with the advocational document are inherited (at least as a default) from the decision with which it has been associated.

Embodiments of the present invention also envision that specific portions of an advocational document (rather than the advocational document as a whole) may be associated with an attribute. An example of such an attribute is "trial transcript" (indicating, e.g., that a portion of an advocational document is a trial transcript).

If it is desired to then select a next portion of the advocational document (or to begin selecting portions of a different related advocational document) then the process will begin again at block 506 using a next portion of an advocational document, as indicated by block 512. Otherwise, the process of FIG. 5 is done. Of course, this process is also envisioned to be implemented for all advocational documents for which associations with a decision may be desired.

Figure 6:
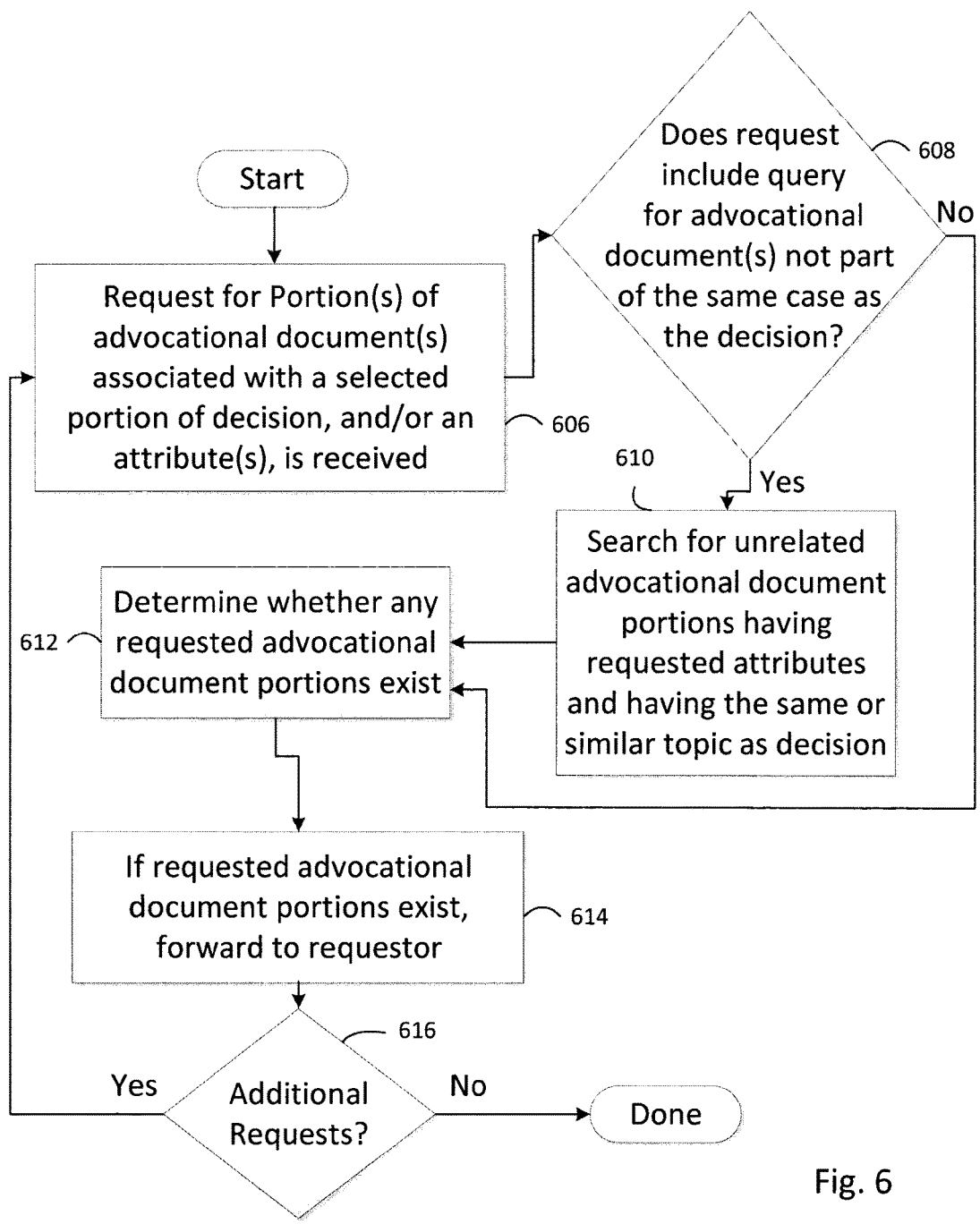
FIG. 6 is a flow diagram depicting an illustrative method of retrieving advocational documents in view of specified attributes and topics in accordance with embodiments of the present invention.

FIG. 6 discloses allowing retrieval of portions of one or more advocational documents of the same or similar topic as a portion of a decision being considered, where the portions of the advocational documents may or may not be associated with (e.g., part of the record of) the decision. Where the advocational documents are not associated with the decision, they are retrieved based on a given attribute (e.g., judge), which may be an attribute taken from (and common with) the decision, or may be an attribute entered by a user, e.g., where a user wished to see what was said in advocational documents (e.g., briefs) relating to a decision from a number of different judges. Germaine to the latter situation, it should be understood that the present invention also envisions that links or other navigational tools may be established within an advocational document so that when a user retrieves a portion of the unrelated advocational document they may readily navigate to an associated portion of a decision to which the unrelated advocational document relates.

Referring to FIG. 6, embodiments of the present invention envision that one or more portions of a decision have previously been associated with one or more portions of at least one advocational document, where each portion of the advocational documents is affiliated with the same or similar topic as the respective portion of the decision it is associated with. It is also envisioned that one or more portions of advocational documents that are available for review have previously been associated with an attribute.

In operation, according to embodiments of the present invention, a request for one or more portions of advocational documents that are associated with a selected portion of a decision (e.g., a portion of a decision that a user is currently considering) and/or that are affiliated with a certain attribute defined either by a user or the decision (but having the same or similar topic as the selected portion of the decision) is received, as indicated by block 606. Thus, for example, a user viewing a portion of a decision may choose to request just a portion of a particular brief that is part of the record of the decision and which previously has been associated with that portion of the decision. In addition (or alternatively) a user may request receipt of portions of briefs from different decisions that are affiliated with the same topic as the portion of the decision at issue (e.g., "schools") and further filter that set using an additional attribute such as "judge" (i.e., requesting briefs from decisions heard by a specific judge). In embodiments of the present invention, the attributes may be taken from the decision or separately selected by the user.

Embodiments of the present invention contemplate that any number of different interfaces may be used to allow a user to convey the request indicated by block 606, including use of various graphical user interfaces with links and data fields, as well as using voice prompts. This also applies to other aspects of the present invention where information is entered.

Upon receipt of the request as described above regarding block 606, a determination is made whether the request includes a query for advocational documents that are not part of the same case as the decision, as indicated by block 608. If the answer is "yes," embodiments of the present invention envision that a search is conducted for unrelated advocational document portions having the requested one or more attributes (e.g., a certain judge) and having the same or similar topic associated with the portion of the decision at issue (e.g., "schools"). This is generally indicated by block 610.

From block 610 (or, if "no," from block 608), a determination is then made regarding whether any of the advocational documents that had been requested exist, as indicated by block 612. It is possible that there are no other advocational documents in the database being queried that contain the criteria being requested. If, however, any do exist, they are then forwarded to the requestor, as indicated by block 614. Embodiments of the present invention envision that the requestor may receive just the requested portion of the advocational document or the entire advocational document with some indication of how to navigate to the portion particularly requested by the requestor.

Block 616 queries whether there are additional requests.

Figure 11:
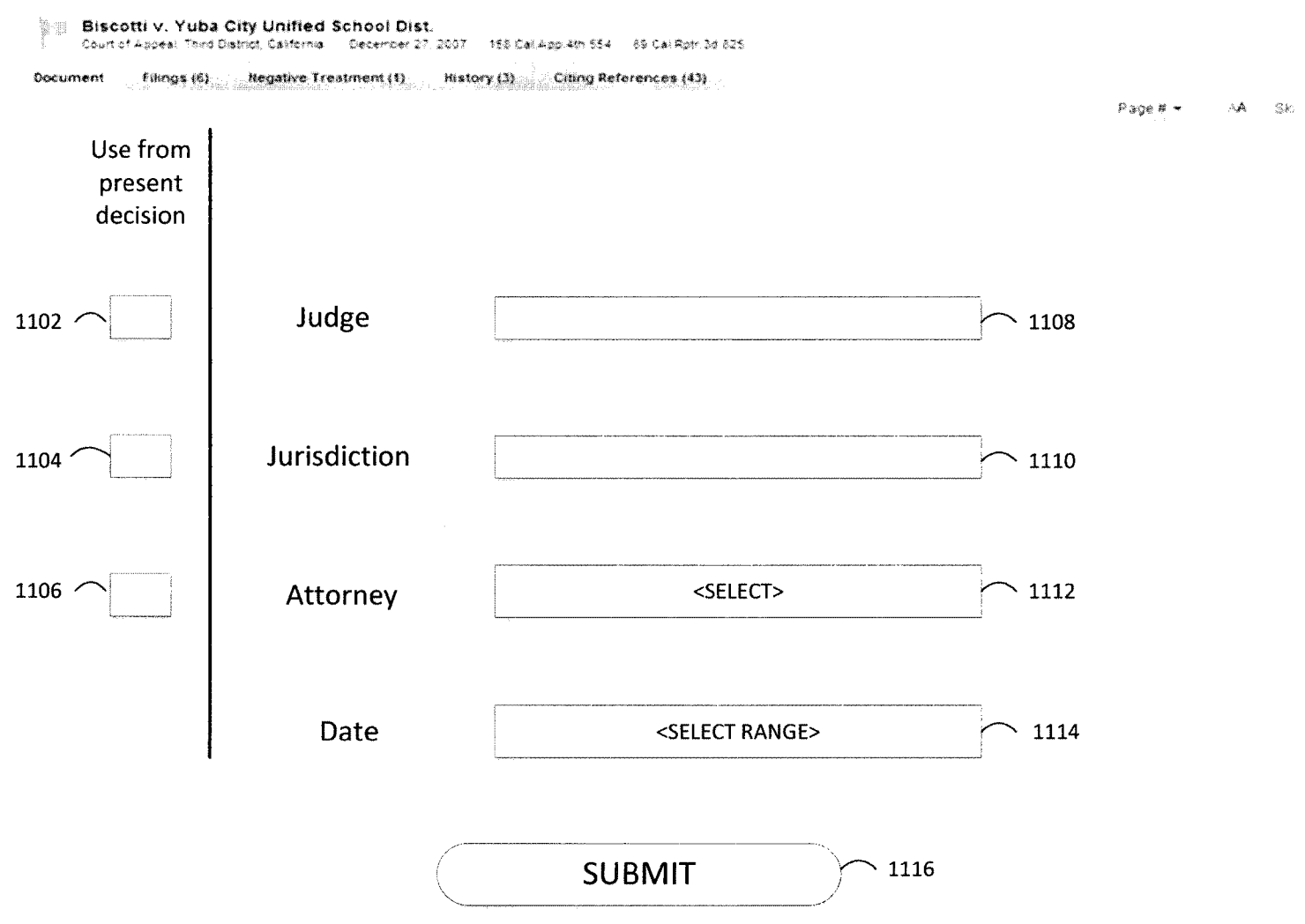

FIG. 11 discloses an example graphical user interface allowing a requestor to request portions of advocational documents that are not part of the same record as the decision being considered, as described above. In this example, a requestor may access this interface from, e.g., FIG. 9, where an additional link could be placed therein indicating "briefs from other cases." Alternatively, any number of other variations are also contemplated by the present invention.

Referring to FIG. 11, in embodiments of the present invention, the topic associated with the portion of the decision being considered (e.g., schools) is automatically used (i.e., inherited) as part of the search for unrelated advocational documents. Thus, by entering the name of a particular judge, a search is performed for advocational documents associated with decisions handed down from the requested judge and containing one or more portions affiliated with the inherited topic. As shown, attributes that may be affiliated with advocational documents and that may thus be searched for include judge, jurisdiction, attorney and date. Of course, it should be understood that the present invention contemplates use of any number of additional and/or alternative attributes. It should also be understood that these attributes can be combined together (e.g., one can search for advocational documents relating to both a particular judge and a particular attorney.

Requested information may be entered by a requestor in any number of ways. In the example of FIG. 11, with regard to judge and jurisdiction, a requestor may insert the specific names of judges and jurisdictions into fields 1108 and 1110, respectively. If box 1102 or 1104 are checked, the judge or jurisdiction, respectively, of the particular decision being considered by the requestor, is automatically used as part of the search criteria. Thus, if box 1102 is checked, the judge from Biscotti v. Yuba City is used as part of the criteria.

For the attribute of "attorney," a requestor may be able to enter the names of various attorneys into field 1112 if the box 1106 is not checked, but be presented with a drop-down menu of attorneys involved with the Biscotti v. Yuba City decision if box 1106 is checked. Also, the requestor may select a date range for advocational documents received by using field 1114.

Once the information has been entered as desired into the various fields and boxes, a requestor may choose to submit the information using, e.g., submit button 1116.

The present invention also contemplates embodiments where, e.g., a single link associated with a portion of a decision (as shown, e.g., at 904 in FIG. 9) may send a requestor to a page containing access to advocational documents that are both related and unrelated to the decision portion at issue.

Figure 7:
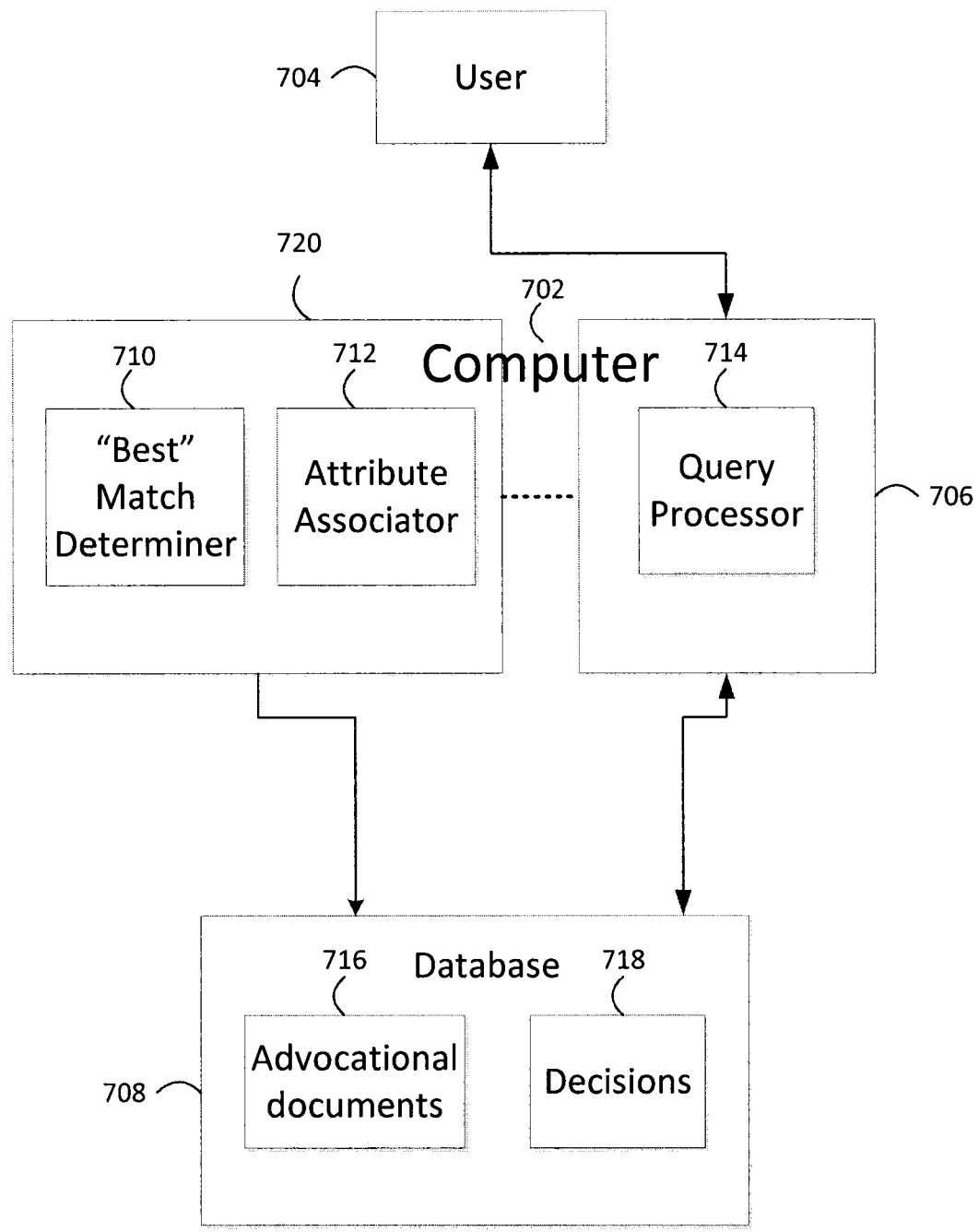
FIG. 7 is a block diagram illustrating an operating environment (and, in some embodiments, aspects of the present invention) in accordance with embodiments of the present invention.

An example structure of embodiments of the present invention and, in other or overlapping embodiments, environments thereof, is depicted by FIG. 7. Referring to FIG. 7, a database 708 is shown to comprise decisions 718 and advocational documents 716. In general, it is envisioned that the database 718 contains advocational documents 716 where each is related to a decision 718. When searching for related or unrelated advocational documents 716 in view of requests as discussed above, embodiments of the present invention envision that the advocational documents are stored in database 708. Of course, it should be understood that database 708 may comprise any number of physical interconnected databases and associated storage.

A computer 702 is shown as containing a "best" match determiner 710 and an attribute associator 712. In embodiments of the present invention, the "best" match determiner 710 compares items of interest from portions of a decision and advocational document as described above and determines which decision portion(s) has the best match. It also associates the portion(s) of the decision having the best match with the appropriate portion of the advocational document and assigns the same (or similar) topic as the decision portion to the advocational document portion. The attribute associator 712 associates attributes (e.g., judge, jurisdiction, etc.) to the advocational document. Thus, the aspect of computer 712 that sets up the information in the database 708 with associations and affiliations as detailed above is the portion indicated at 720. A query processor 714 shown at portion 706 of computer 702 then handles requests from, e.g., a user 704, as detailed above.

It should be understood that the configuration shown in FIG. 7 is by way of example, and any number of different configurations of functional modules such as (and in addition to or less than) those described above and computer components to implement the various functions described herein are contemplated. It should also be understood that database 708 may have its own separate computer components operating therewith and that user 704 may be stationed at a separate computer. These separate computer components as shown is FIG. 7 may be interconnected via local area network and/or the internet, or the like. In addition, they could also all be part of a single computer.

Figure 8:
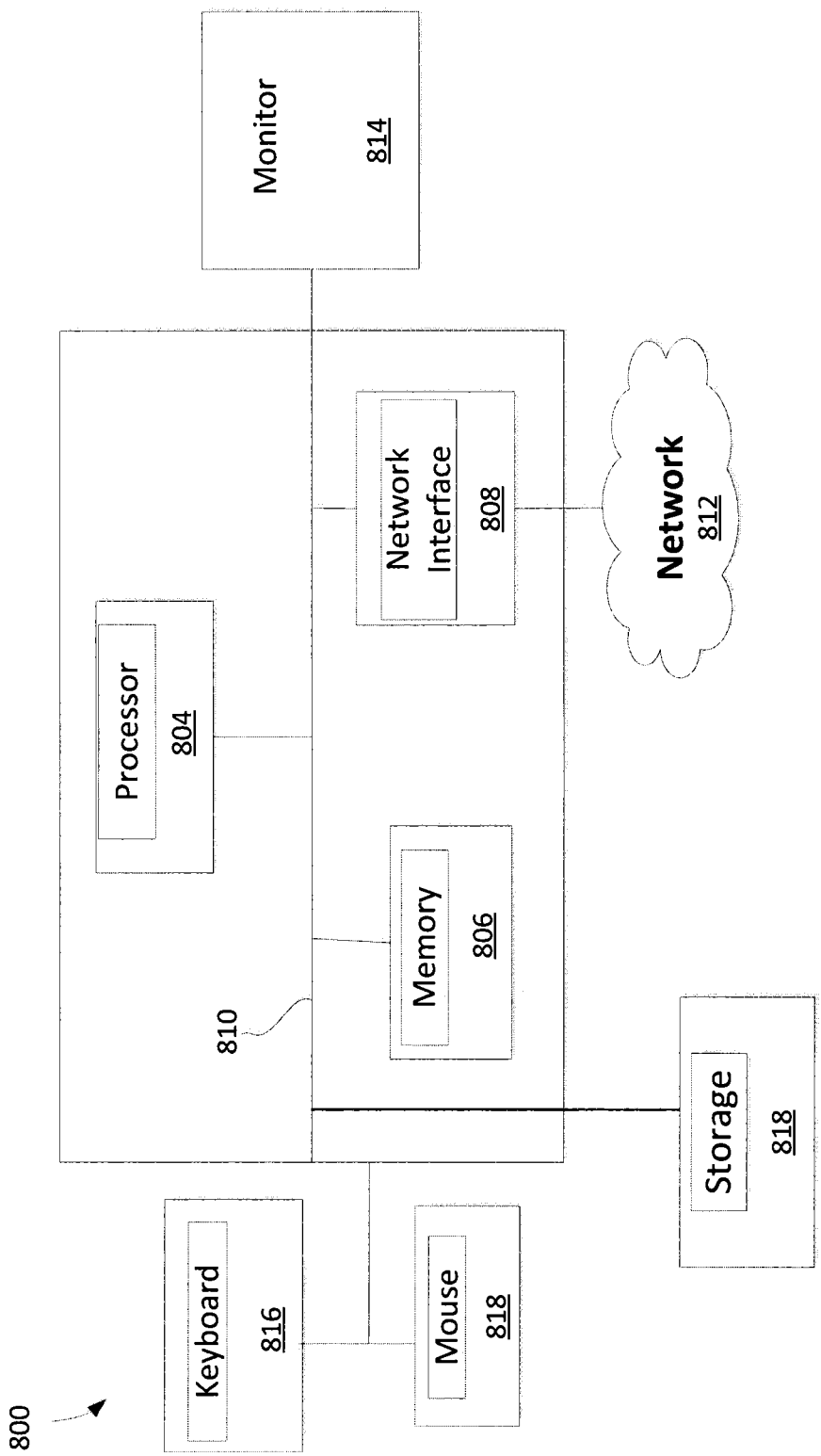
FIG. 8 is a block diagram illustrating additional aspects of an operating environment (and, in some embodiments, aspects of the present invention) in accordance with embodiments of the present invention.

FIG. 8 illustrates a computer system 800, and portions thereof, that may serve as one or more aspects of computer 702, database 708 and/or a computer system utilized by user 704 (in whole or part). The illustrated computer system 800 includes a processor 804 coupled to a memory 806 and a network interface 808 through a bus 810. The network interface 808 is also coupled to a network 812 such as the Internet. The computer system 800 may further include a monitor 814, a keyboard 816, and a mouse 818. In other embodiments, the computer system 800 may use other mechanisms for data input/output and may include a plurality of components (e.g., a plurality of memories 806 or buses 810).

In some embodiments, the computer system 800 includes a computer-readable medium containing instructions that cause the processor 804 to perform specific functions that are described herein. That medium may include a hard drive, a disk, memory, or a transmission, among other computer-readable media. The computer system may also include storage 818 which may include database 708 and/or be a separate storage device used for other purposes associated with computer system 800. The computer system 800 may be or be part of (or have within it) any number of different types of, e.g., server, personal computer or mainframe-type systems.

The various aspects of the present invention may utilize any number of different programming languages and packages, including java and C#.

While embodiments of the present invention have been described with specificity, the description itself is not intended to limit the scope of this patent. Rather, the inventors have contemplated that the claimed invention may also be embodied in other ways, to include different steps or features, or combinations of steps or features in addition to the ones described in this document, in some cases in conjunction with other technologies.

The invention claimed is:

1. A computer-implemented method for establishing linkages between an advocational document and a decision, wherein the advocational document and decision each include a plurality of portions, the method comprising:
   for a selected portion of the advocational document, identifying one or more advocational document items of interest within the advocational document;
   for each of one or more portions of the decision, identifying one or more decision items of interest;
   for each of the one or more portions of the decision, comparing the one or more items of interest of the selected portion of the advocational document with the one or more decision items of interest to generate a plurality of match scores, wherein each match score is affiliated with one of the portions of the decision;
   determining which of said match scores is a best match score based upon pre-determined criteria;
   determining that the best match score is above a pre-determined threshold; and
   associating the selected portion with the portion of the decision affiliated with the best match score in response to determining that the best match score is above the pre-determined threshold.

2. The computer-implemented method of claim 1, wherein the one or more items of interest include at least one of case citations, statute citations, quotations and text n-grams.

3. The computer-implemented method of claim 2, wherein the best match score is a match score indicative of the most total matches of said at least one of said case citations, statute citations, quotations and text n-grams.

4. The computer-implemented method of claim 2, wherein at least one item of interest is weighted more heavily than other of said one or more items of interest in determining the best match score.

5. The computer-implemented method of claim 1, wherein a thesaurus is used to match otherwise inexact items of interest in said step of comparing.

6. The computer-implemented method of claim 1, wherein determining which of said match scores is a best match score further comprises determining which of a range of match scores are the best match scores and associating the selected portion with the portions of the decision whose comparison resulted in the best match scores.

7. The computer-implemented method of claim 1, wherein each decision portion is capable of having a pre-determined affiliation with a topic, further comprising assigning, to the selected portion, a topic associated with the portion of the decision affiliated with the best match score.

8. The computer-implemented method of claim 7, wherein said step of associating further comprises linking a headnote in the decision tied to the portion of the decision affiliated with the best match score with the selected portion of the advocational document.

9. The computer-implemented method of claim 8, wherein the step of assigning the topic to the selected portion creates a corresponding headnote in the advocational document, wherein the link to the advocational document is to the headnote of the advocational document, and wherein the headnote of the advocational document is tied to the selected portion of the advocational document.

10. A computer-implemented method for processing a request for retrieving at least one portion of one or more advocational documents, wherein one or more portions of the one or more advocational documents have been associated with at least one portion of a decision based on best match criteria and linked to the decision as being part of a tribunal record of the decision, the method comprising:
receiving an indication that a requestor has requested obtaining at least one portion of the one or more advocational documents associated with a portion of a decision selected by the requestor, wherein the selected portion of the decision has a pre-determined affiliation with a topic;
determining that at least one portion of the one or more advocational documents as associated with the portion of the decision selected by the requestor exists; and
conveying the entire advocational document to the requestor upon determining that the at least one portion of one or more advocational documents associated with the portion of the decision selected by the requestor exists.

11. The computer-implemented method of claim 10, wherein the at least one portion of the one or more advocational documents associated with the selected portion of the decision is affiliated with substantially the same topic as the selected portion.

12. The computer-implemented method of claim 10, wherein the advocational document contains navigation features for allowing a user to navigate to the portion of the advocational document associated with the portion of the decision selected by the requestor.

13. The computer-implemented method of claim 10, further comprising:
conveying to the requestor a list of two or more advocational documents each having at least one portion associated with the portion of the decision selected by the requestor; and
allowing the requestor to then select one of said two or more advocational documents from the list.

14. A system for establishing linkages between an advocational document and a decision, wherein the advocational document and decision each include a plurality of portions, and wherein each decision portion is capable of having a pre-determined affiliation with a topic, the system comprising:
a linkage server having a hardware processor and a non-transitory computer-readable medium; and
a database containing the advocational document and decision,
wherein the non-transitory computer-readable medium contains instructions that cause the processor to
for a selected portion of the advocational document, identify one or more advocational document items of interest within the advocational document;
for each of one or more portions of the decision, identify one or more decision items of interest;
for each of the one or more portions of the decision, compare the one or more items of interest of the selected portion of the advocational document with the one or more decision items of interest to generate a plurality of match scores, wherein each match score is affiliated with one of the portions of the decision;
determine that at least one match score is above a pre-determined threshold; and
associate the selected portion with the portion of the decision affiliated with the best match score in response to determining that at least one match score is above the pre-determined threshold.

15. The system of claim 14, wherein the linkage server and database communicate via the Internet or local area network.

16. The system of claim 14, wherein the one or more items of interest include at least one of case citations, statute citations, quotations and text n-grams.

17. The system of claim 16, further comprising:
determining which of said match scores is a best match score based upon pre-determined criteria, wherein the best match score is a match score indicative of the most total matches of said at least one of said case citations, statute citations, quotations and text n-grams.

18. The system of claim 17, wherein at least one item of interest is weighted more heavily than other of said one or more items of interest in determining the best match score.

19. The system of claim 17, wherein determining which of said match scores is a best match score further comprises determining which of a range of match scores are the best match scores and associating the selected portion with the portions of the decision whose comparison resulted in the best match scores.

20. A system for processing a request for retrieving at least one portion of one or more advocational documents, wherein one or more portions of the one or more advocational documents have been associated with at least one portion of a decision based on best match criteria and linked to the decision as being part of a tribunal record of the decision, comprising:
an inquiry server having a hardware processor and a non-transitory computer-readable medium; and
a database containing the one or more advocational document and decision,
wherein the non-transitory computer-readable medium contains instructions that cause the processor to:
receive an indication that a requestor has requested obtaining at least one portion of the one or more advocational documents associated with a portion of a decision selected by the requestor, wherein the selected portion of the decision has a pre-determined affiliation with a topic;

determine that at least one portion of the one or more advocational documents as associated with the portion of the decision selected by the requestor exists;

forward to the requestor a list of two or more advocational documents each having at least one portion associated with the portion of the decision selected by the requestor; and allow the requestor to then select one of said two or more advocational documents from the list.

21. The system of claim 20 wherein the inquiry server and database connected via the Internet or local area network.

22. The system of claim 20, wherein the non-transitory computer-readable medium contains instructions that further cause the processor to: forward the entire advocational document to a requestor, wherein the advocational document contains navigation features for allowing a user to navigate to the portion of the advocational document associated with the portion of the decision selected by the requestor.

* * * * *